United States Patent
Lee et al.

(10) Patent No.: US 11,580,446 B2
(45) Date of Patent: Feb. 14, 2023

(54) METHOD AND SYSTEM FOR FILTERING OBSTACLE DATA IN MACHINE LEARNING OF MEDICAL IMAGES

(71) Applicant: AJOU UNIVERSITY INDUSTRY-ACADEMIC COOPERATION FOUNDATION, Suwon-si (KR)

(72) Inventors: Jung Won Lee, Seoul (KR); Ye Seul Park, Incheon (KR); Dong Yeon Yoo, Suwon-si (KR); Chang Nam Lim, Seoul (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 680 days.

(21) Appl. No.: 16/654,563

(22) Filed: Oct. 16, 2019

(65) Prior Publication Data
US 2020/0175420 A1 Jun. 4, 2020

(30) Foreign Application Priority Data
Nov. 30, 2018 (KR) .................. 10-2018-0152862

(51) Int. Cl.
*G06N 20/00* (2019.01)
*G06K 9/62* (2022.01)
*G06T 7/00* (2017.01)

(52) U.S. Cl.
CPC ........... *G06N 20/00* (2019.01); *G06K 9/6267* (2013.01); *G06T 7/0012* (2013.01)

(58) Field of Classification Search
CPC ..... G06N 20/00; G06K 9/6267; G06T 7/0012
(Continued)

(56) References Cited

U.S. PATENT DOCUMENTS

| 2015/0230773 A1* | 8/2015 | Cho ..................... A61B 8/5223 |
| | | 382/128 |
| 2017/0258296 A1* | 9/2017 | Kaku ................... A61B 5/7278 |

(Continued)

FOREIGN PATENT DOCUMENTS

| JP | 2016-144626 A | 8/2016 |
| KR | 10-2001-0017092 A | 3/2001 |

(Continued)

OTHER PUBLICATIONS

F. Vilarino et al., "Automatic Detection of Intestinal Juices in Wireless Capsule Video Endoscopy", The 18th International Conference on Pattern Recognition, IEEE Computer Society, 2006, 4 pgs.

(Continued)

*Primary Examiner* — Jin Ge
(74) *Attorney, Agent, or Firm* — Sughrue Mion, PLLC

(57) ABSTRACT

The present disclosure relates to a method for filtering selectively obstacle to be an obstacle to machine learning according to a learning purpose and a system thereof. A system for filtering obstacle data in machine learning of medical images may include an obstacle data definition unit configured to receive definitions of obstacle data according to a machine learning purpose; a filter generation unit configured to generate a filter for filtering the obstacle data; and a filtering unit configured to remove obstacle data in machine learning using the generated filter.

10 Claims, 5 Drawing Sheets

(58) Field of Classification Search
USPC .......................................................... 706/12
See application file for complete search history.

(56) References Cited

U.S. PATENT DOCUMENTS

2020/0397238 A1* 12/2020 Dray .................... A61B 1/0002
2021/0374953 A1* 12/2021 Asiedu ..................... G06T 7/11

FOREIGN PATENT DOCUMENTS

KR    1020140145801 A    12/2014
KR    10-2016-0012758 A    2/2016

OTHER PUBLICATIONS

Communication dated Dec. 24, 2019, issued by the Korean Intellectual Property Office in Korean Application No. 10-2018-0152862.

Communication dated Aug. 19, 2019, from the Korean Intellectual Property Office in Application No. 10-2018-0152862.

* cited by examiner

[FIG. 1]
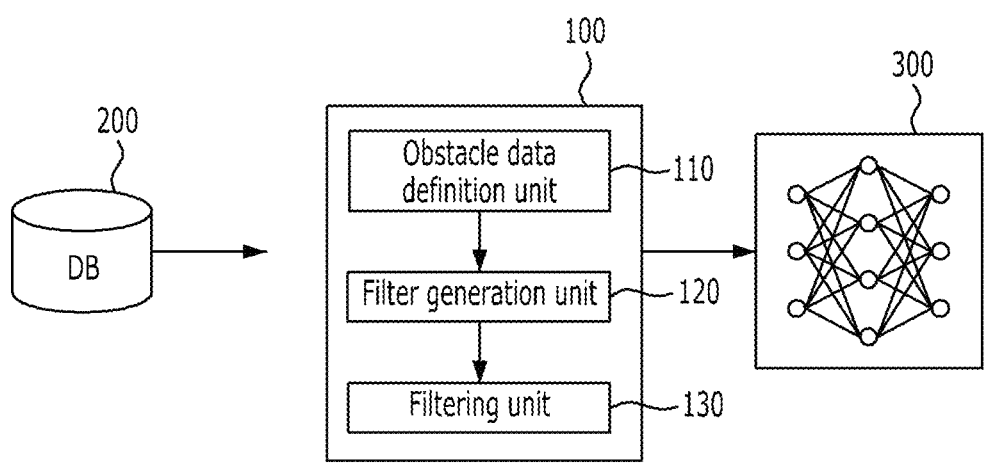
[FIG. 2]
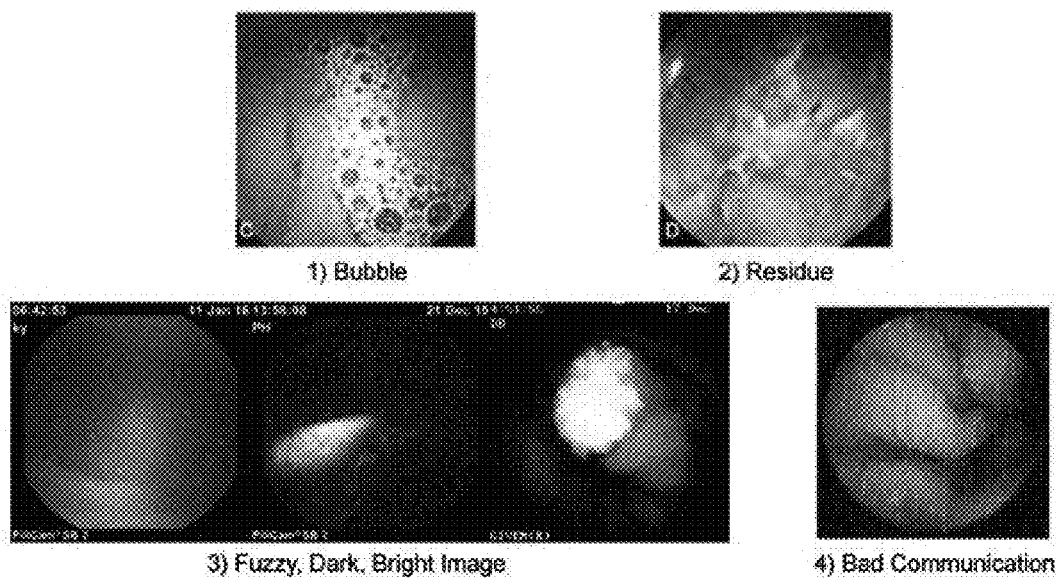

[FIG. 3]
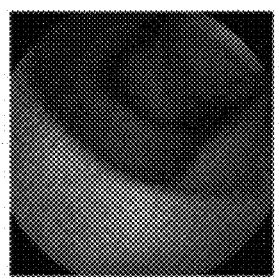
5) Intestinal Juice
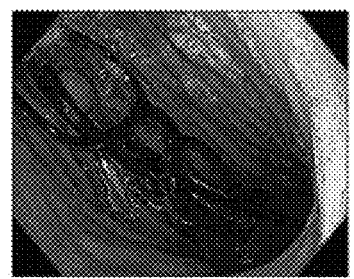
6) Foreign Body Ingestion
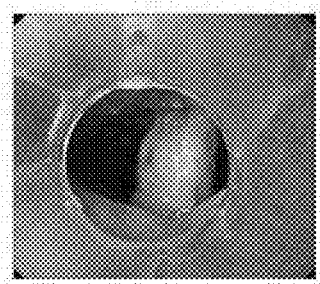
7) Food Bolus Impaction
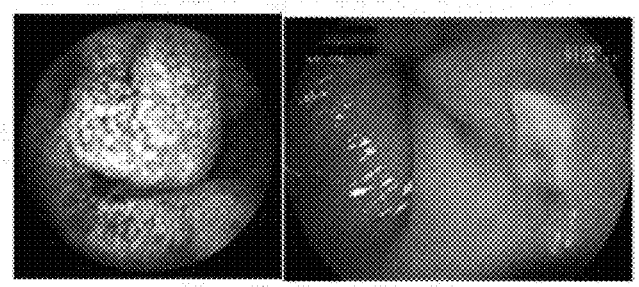
8) Lesion Image(Many, Little)

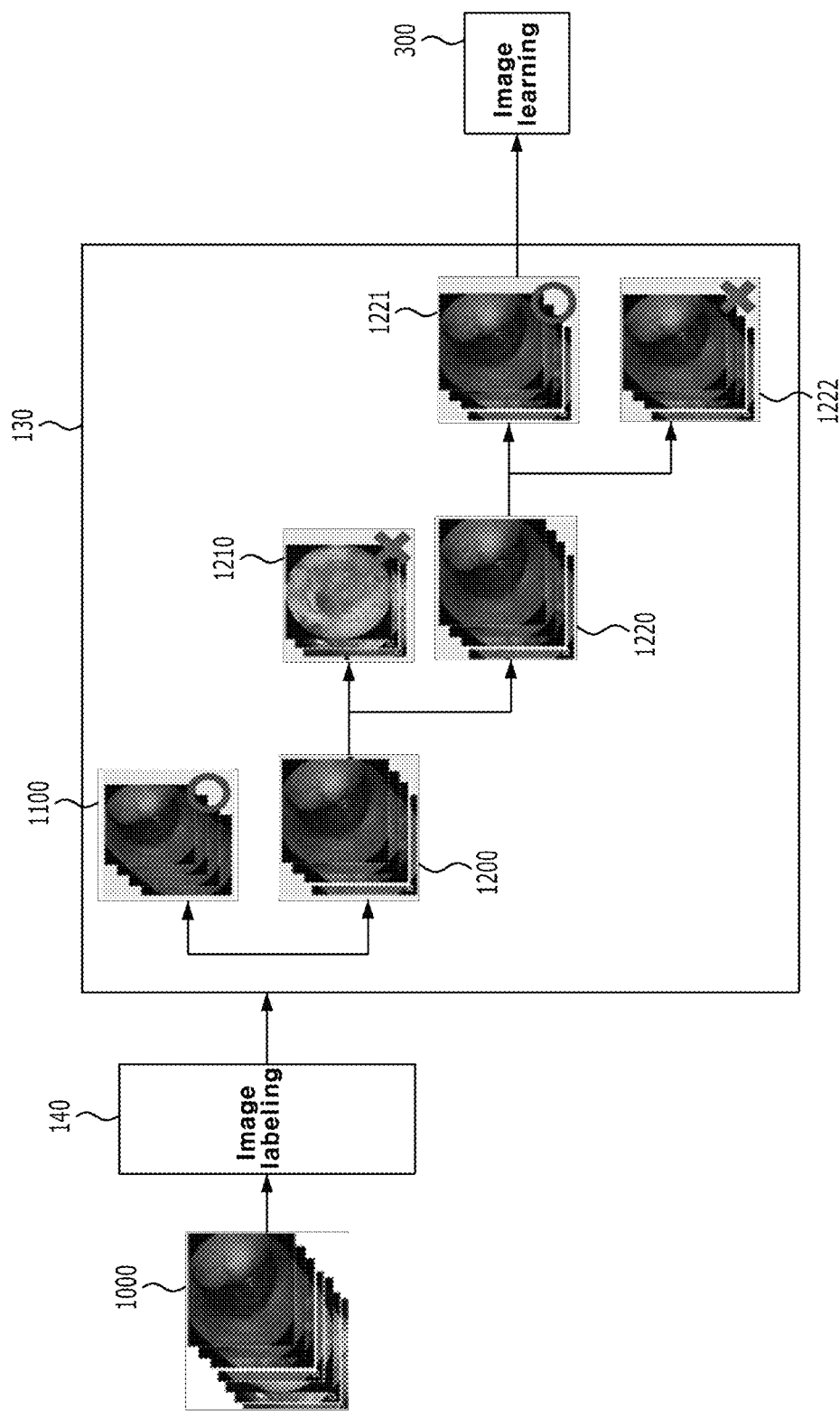

[FIG. 5A]
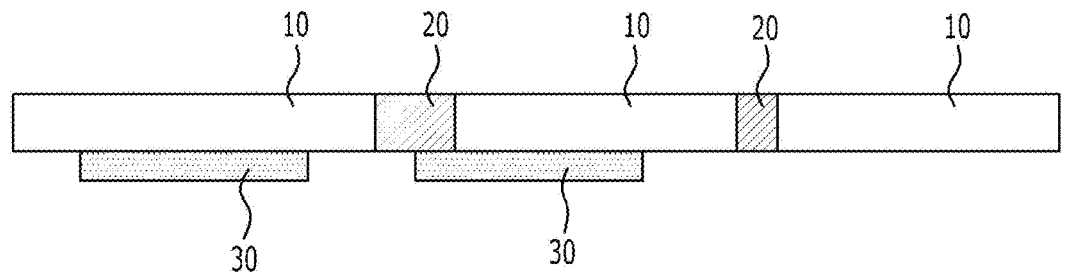
[FIG. 5B]
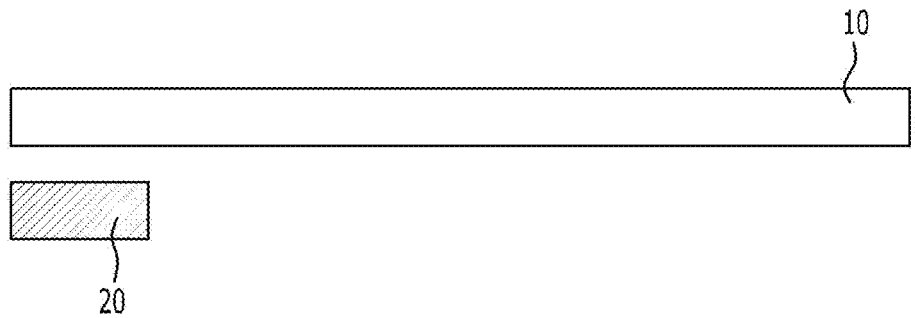
[FIG. 5C]
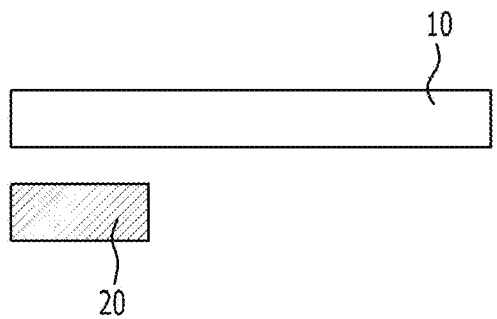

[FIG. 6]
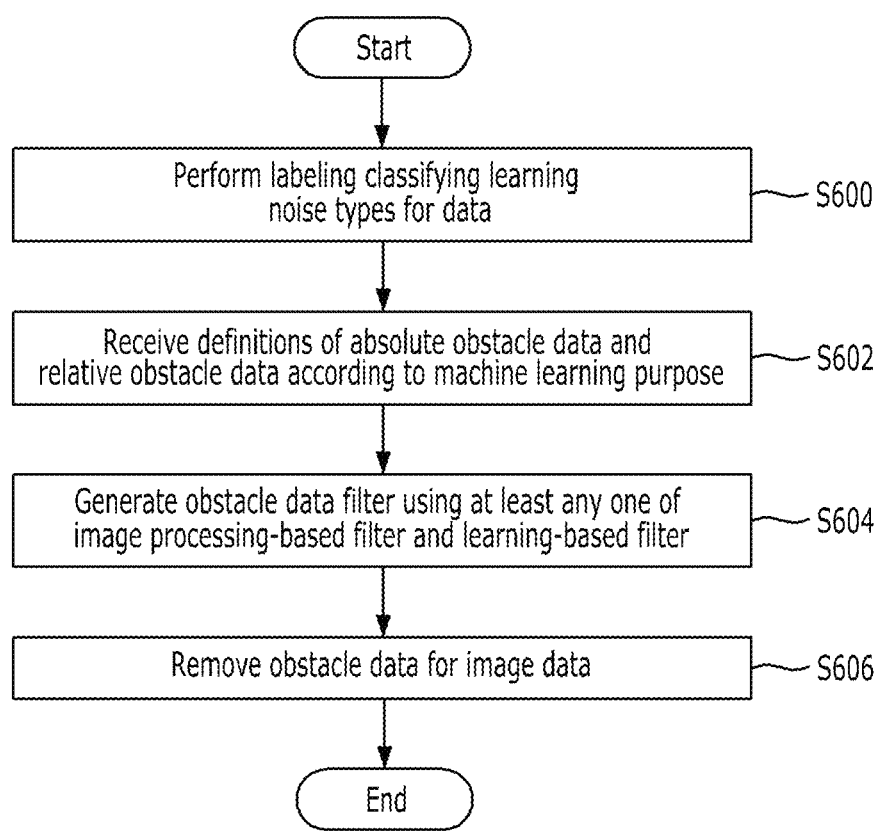

METHOD AND SYSTEM FOR FILTERING OBSTACLE DATA IN MACHINE LEARNING OF MEDICAL IMAGES

CROSS-REFERENCE TO RELATED APPLICATIONS

This application claims the priority of Korean Patent Application No. 10-2018-0152862 filed on Nov. 30, 2018, in the Korean Intellectual Property Office, the disclosure of which is incorporated herein by reference.

BACKGROUND

Field

The present disclosure relates to a method and a system for filtering obstacle data in machine learning of medical images, and more particularly, to a method and a system capable of selectively filtering the obstacle data in machine learning according to a learning purpose.

Description of the Related Art

Recently, new algorithms have been developed in many studies adopting machine learning and deep learning techniques, and attempts have been made to apply the new algorithms to medical images such as capsule endoscopic images. In the case of capsule endoscopy, a main purpose of learning is primarily to find various types of lesions or to track a location of a gastrointestinal tract.

The capsule endoscopy is done by taking pictures of the intestines for a long period of time of 10 hours or longer. However, since the capsule endoscopic image includes a lot of noise images that hinder learning, if the learning is performed after the noise image is not filtered, problems such as deterioration of performance of the learning and increase of time required for the learning occur.

Furthermore, in learning using the capsule endoscopic image, positive data, which is the purpose of the learning, is much smaller than other negative data, resulting in an unbalanced data set problem.

Therefore, there is a need for an algorithm that enables more effective learning by reducing a ratio difference between the positive data which are objectives of the learning, and the negative data.

Methods for filtering noise, which have been developed in recent years are just limited to a method for removing only noise such as bubbled images and there is no method for selectively removing the noise according to the objective of the learning in order to perform the machine learning.

SUMMARY

The present disclosure is contrived to solve the problems, and an object of the present disclosure is to provide a method and a system for filtering obstacle data in machine learning of medical images.

The technical objects of the present disclosure are not restricted to the aforementioned technical objects, and other objects of the present disclosure, which are not mentioned above, will become more apparent to one of ordinary skill in the art to which the present disclosure pertains by referencing the detailed description of the present disclosure given below.

An exemplary embodiment of the present disclosure provides a method for filtering obstacle data in machine learning of medical images using a system including an obstacle data definition unit, a filter generation unit, and a filtering unit, the method including: receiving, by the obstacle data definition unit, definitions of obstacle data according to a machine learning purpose; generating, by the filter generation unit, a filter for filtering the obstacle data; and removing, by the filtering unit, obstacle data to machine learning using the generated filter.

According to an exemplary embodiment of the present disclosure, the obstacle data may include absolute obstacle data in learning regardless of the machine learning purpose and relative obstacle data in learning according to a type of the machine learning purpose.

According to an exemplary embodiment of the present disclosure, in the generating of the filter, the filter generation unit may generate an obstacle data filter using at least any one of an image processing-based filter and a learning-based filter.

According to an exemplary embodiment of the present disclosure, the method for filtering obstacle data of medical image data for machine learning may further include performing, by a labeling unit, labeling based on the machine learning for the medical image data for the machine learning, in which the labeling is to classify types of obstacle data.

Another exemplary embodiment of the present disclosure provides a system for filtering obstacle data in machine learning of medical images including: an obstacle data definition unit configured to receive definitions of obstacle data according to a machine learning purpose; a filter generation unit configured to generate a filter for filtering the obstacle data; and a filtering unit configured to remove obstacle data to machine learning using the generated filter.

According to an exemplary embodiment of the present disclosure, the filter generation unit may generate an obstacle data filter using at least any one of an image processing-based filter and a learning-based filter.

According to an exemplary embodiment of the present disclosure, the system for filtering obstacle data may further include a labeling unit configured to perform labeling based on the machine learning for the medical image data for the machine learning, in which the labeling is to classify types of obstacle data.

According to a method and a system for filtering obstacle data of medical image data for machine learning according to an exemplary embodiment of the present disclosure, an obstacle image data in learning can be selectively removed according to a learning objective before using a medical image as learning data.

That is, by selectively removing obstacle data in the learning according to the learning objective, the obstacle data is removed to extract meaningful learning data, thereby enhancing performance of the learning and reduce a time required for the learning.

The effects of the present disclosure are not limited to the aforementioned effect, and other effects, which are not mentioned above, will be apparent to a person having ordinary skill in the art from the following disclosure.

BRIEF DESCRIPTION OF THE DRAWINGS

The above and other aspects, features and other advantages of the present disclosure will be more clearly understood from the following detailed description taken in conjunction with the accompanying drawings, in which:

FIG. 1 is a block diagram of a system for filtering obstacle data in machine learning of medical images and a diagram for describing an operating method of the system according to an exemplary embodiment of the present disclosure;

FIG. 2 illustrates an image defined as absolute obstacle data according to an exemplary embodiment of the present disclosure;

FIG. 3 illustrates an image defined as relative obstacle data according to an exemplary embodiment of the present disclosure;

FIG. 4 illustrates a sequence of filtering obstacle data in machine learning of medical images according to an exemplary embodiment of the present disclosure;

FIGS. 5A to 5C are diagrams for describing an effect of removing obstacle data by using the present disclosure; and FIG. 6 is a flowchart of a method for filtering obstacle data in machine learning of medical images according to an exemplary embodiment of the present disclosure.

DETAILED DESCRIPTION OF THE PREFERRED EMBODIMENT

The present disclosure may be variously modified and have various embodiments and specific exemplary embodiments will be described in detail with reference to drawings. However, this does not limit the present disclosure to specific exemplary embodiments, and it should be understood that the present disclosure covers all the modifications, equivalents and replacements included within the idea and technical scope of the present disclosure. In describing each drawing, reference numerals refer to like elements.

Terms including as first, second, A, B, and the like are used for describing various constituent elements, but the constituent elements are not limited by the terms. The terms are used only to discriminate one constituent element from another component. For example, a first component may be referred to as a second component, and similarly, the second component may be referred to as the first component without departing from the scope of the present disclosure. A term 'and/or' includes a combination of a plurality of associated disclosed items or any item of the plurality of associated disclosed items.

It should be understood that, when it is described that a component is "connected to" or "accesses" another component, the component may be directly connected to or access the other component or a third component may be present therebetween. In contrast, it should be understood that, when it is described that a component is "directly connected to" or "directly accesses" another component, it is understood that no element is present between the element and another element.

Terms used in the present application are used only to describe specific exemplary embodiments, and are not intended to limit the present disclosure. A singular form may include a plural form if there is no clearly opposite meaning in the context. In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

If not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Throughout the specification and claims, unless explicitly described to the contrary, a case where any part "includes" any component will be understood to imply the inclusion of stated components but not the exclusion of any other component.

Hereinafter, preferred exemplary embodiments of the present disclosure will be described in detail with reference to the accompanying drawings.

Throughout the specification, "learning" refers to a process of training data to perform judgment or prediction on data using machine learning or deep learning algorithms in a field of artificial intelligence.

In addition, "obstacle data" refers to obstacle that interferes with learning, and may include an image that is not suitable for learning by applying an artificial intelligence algorithm even when a resolution of an image itself is good because there is no problem of communication failure. For example, a bubbled image may correspond to obstacle data. obstacle throughout the specification means simply referring to the obstacle data.

Meanwhile, the medical image according to an exemplary embodiment of the present disclosure will be described by taking a capsule endoscopic image as an example, but the present disclosure is not limited thereto and may include other types of medical images.

FIG. 1 is a block diagram of a system for filtering obstacle data in machine learning of medical images and a diagram for describing an operating method of the system according to an exemplary embodiment of the present disclosure.

A system 100 for filtering obstacle data of medical images for machine learning according to an exemplary embodiment of the present disclosure receives a capsule endoscopic image stored in a database 200 and filters obstacle data, and then transmits the medical image data which the obstacle data is removed to an image learning unit 300.

That is, the system 100 for filtering obstacle data in machine learning of medical images according to the exemplary embodiment of the present disclosure may perform preprocessing before performing the machine learning of the medical images.

The system 100 for filtering obstacle data in machine learning of medical images for machine learning according to the exemplary embodiment of the present disclosure includes an obstacle data definition unit 110, a filter generation unit 120, and a filtering unit 130.

The obstacle data definition unit 110 receives definitions of obstacle data according to a machine learning purpose by a user input. According to the exemplary embodiment of the present disclosure, the obstacle data may be classified into absolute obstacle data which becomes an obstacle to learning regardless of the machine learning purpose, and relative obstacle data which becomes an obstacle to learning according to a type of the machine learning purpose.

The absolute obstacle data and the relative obstacle data will be described with reference to FIGS. 2 and 3.

FIG. 2 illustrates an image defined as absolute obstacle data according to an exemplary embodiment of the present disclosure and FIG. 3 illustrates an image defined as relative obstacle data according to an exemplary embodiment of the present disclosure.

Absolute obstacle data illustrated in FIG. 2 is a bubbled capsule endoscopic image (1. Bubble), an image of floating food waste in digesting (2. Residue), a fuzzy, dark or bright image (3. Fuzzy, Dark, Bright Image), and an image with obstacle due to bad communication (4. Bad Communication).

Relative obstacle data illustrated in FIG. 3 includes an image of the gastrointestinal tract filled with intestinal juices (5. Intestinal Juice), an image showing foreign matters such as coins and nails (6. Foreign Body Ingestion), an adhesive closing image due to food bolus (7. Food Bolus Impaction), and an image with many lesions enough to block the structure of the gastrointestinal tract as an image including lesions (8. Lesion Image).

The absolute obstacle data and the relative obstacle data illustrated in FIGS. 2 and 3 are summarized in Table 1 below.

TABLE 1

| Absolute obstacle data image | Relative obstacle data image |
| --- | --- |
| Bubbled image (Bubble) | Image of the gastrointestinal tract filled with intestinal juices (Intestinal Juice) |
| Image with food residues (Residue) | Image showing foreign matters (Foreign Body Ingestion) |
| Fuzzy, dark, or bright image (Fuzzy, Dark, Bright Image) | Image of adhesive closing due to food bolus (Food Bolus Impaction) |
| Image with noise (Bad Communication) | Image including many lesions (Lesion Image) |

According to an exemplary embodiment of the present disclosure, obstacle data may be defined according to a machine learning purpose. For example, for the purpose of learning to detect lesions, the obstacle data may be 1) a bubbled image (Bubble), 2) an image with food residues (Residue), 3) a fuzzy, dark, or bright image (Fuzzy, Dark, Bright Image), and 4) an image with obstacle (Bad Communication), which correspond to the absolute obstacle data.

For example, for the purpose of learning to determine a position of the capsule endoscope, the obstacle data may be 1) a bubbled image (Bubble), 2) an image with food residues (Residue), 3) a fuzzy, dark, or bright image (Fuzzy, Dark, Bright Image), and 4) an image with obstacle (Bad Communication) and an image containing many lesions (Lesion Image).

According to the exemplary embodiment of the present disclosure, the image containing many lesions (Lesion Image) may be included in obstacle data according to the machine learning purpose or may not be included in the obstacle data.

That is, according to the exemplary embodiment of the present disclosure, a type of the image classified as obstacle data may vary according to the learning purpose, and the image classified as the obstacle data may be or not be filtered with obstacle filer according to the learning purpose.

Referring back to FIG. 1, the filter generation unit 120 and the filtering unit 130 will be described.

The filter generation unit 120 according to an exemplary embodiment of the present disclosure may generate an obstacle data filter using at least any one of an image processing-based filter and a learning-based filter.

The image processing-based filter may use a Gabor filter, a Histogram analysis, etc. as image processing techniques in the related art, and the learning-based filter generates a filter for removing an obstacle image using machine learning and deep learning. More particularly, the filter generation unit 120 may generate a filter using a technique such as a support vector machine (SVM) or a convolutional neutral network (CNN).

For example, the bubbled obstacle image (Bubble) may generate a filter using a Gabor filter, a gray-level co-occurrence matrix (GLCM), and a speeded-up robust features (SURF) algorithm, the image with the food residues (Residues) may generate a filter using histogram or a convolutional neural network (CNN), the fuzzy, dark or bright image (Fuzzy, Dark, Bright Image) may generate a filter using histogram and wavelet transform CNN, and the image with obstacle (Bad Communication) may generate a filter using an edge algorithm.

Additionally, the image of the gastrointestinal tract filled with intestinal juices (Intestinal Juice), the image showing foreign matters (Foreign Body Ingestion), and the adhesive closing image due to food bolus (Food Bolus Impaction) may generate filters using histogram, and the image including many lesions (Lesion Image) may generate a filter using edge and histogram.

However, the method of generating the obstacle data filter is not limited to the above-described technique, and the filter may be generated by applying another type of technique.

The filtering unit 130 according to the exemplary embodiment of the present disclosure removes an obstacle image from the capsule endoscope image data stored in the database 200 using a filter generated from the filter generation unit 120.

The filtering unit 130 filters the absolute obstacle data image and the relative obstacle data image defined by the user as an obstacle to learning, as non-learnable data, and the filtered data is used as the learning data.

FIG. 4 illustrates a sequence of filtering obstacle data in machine learning of medical images according to an exemplary embodiment of the present disclosure.

Referring to FIG. 4, the system for filtering obstacle data in machine learning of medical images according to an exemplary embodiment of the present disclosure may further include a labeling unit 140.

The labeling unit 140 may classify the obstacle data by labeling an obstacle data type on a medical image source data 1000 stored in the database.

The labeling unit according to an exemplary embodiment of the present disclosure may perform labeling based on a machine learning algorithm such as a support vector machine (SVM) or a neural network (NN).

The filtering unit 130 classifies the labeled image data into a non-obstacle image 1100 and an obstacle image 1200 and excludes an absolute obstacle image 1210 from the obstacle image 1200 and filters a relative obstacle image 1220.

Further, the relative obstacle data 1222, which is not suitable for learning, is removed according to the learning purpose, and only the relative obstacle data 1221 suitable for learning is applied to the image learning unit 300.

FIGS. 5A to 5C are diagrams for describing an effect of removing obstacle data by using the present disclosure.

FIG. 5A illustrates a ratio or the entire medical image data set, FIG. 5B illustrates comparing negative/positive image data before removing obstacle data, and FIG. 5C illustrates comparing negative/positive image data after removing the obstacle data.

Referring to FIGS. 5A and 5B, since negative image data 10 is much greater than positive image data 20 in the medical image data, the obstacle data 30 also has a high ratio of the negative image data 10.

According to the exemplary embodiment of the present disclosure, when the obstacle data 30 is removed, since the negative image data 10 has a high probability to be removed, as illustrated in FIG. 5C, a ratio of the positive image data 10 to the negative image data 10 may be higher than before removing the obstacle data.

In one embodiment, a result of removing obstacle data according to the learning purpose according to the exemplary embodiment of the present disclosure will be described with respect to a capsule endoscopic image data acquired for 11 patients. The capsule endoscopic image original data uses 253,003 sheets.

When the learning is for tracking the position, the obstacle data becomes the bubbled image (Bubble), the image with the food residues (Residues), a bright image (Bright), the image with obstacle (Bad Communication), and a bleeding image (Bleeding). The bleeding image (Bleeding) as a relative obstacle data corresponds to an image that is not suitable for learning to track the position of the capsule endoscope.

An obstacle image may be confirmed based on the labeling, and the number of the bubbled image (Bubble), the image with the food residues (Residues), the bright image (Bright), the image with obstacle (Bad Communication), and the bleeding image (Bleeding) are confirmed as 505 sheets, 14183 sheets, 1034 sheets, 26 sheets, and 2737 sheets, respectively.

If obstacle data is removed from the medical image data according to the exemplary embodiment of the present disclosure, an obstacle data of 7.306% may be removed according to the following Equation (1).

$$\text{Removal rate of obstacle data} = \frac{(\text{Bubble}) + (\text{Residue}) + (\text{Bright}) + (\text{Bad Communication}) + (\text{Bleeding})}{\text{Total}} \times 100 = \frac{505 + 14183 + 1034 + 26 + 2737}{253,003} \times 100 = 7.306\%$$

[Equation 1]

On the other hand, when the learning is for detecting lesions, the obstacle data becomes the bubbled image (Bubble), the image with the food residues (Residues), the bright image (Bright), and the image with obstacle (Bad Communication). The bleeding image (Bleeding) as a relative obstacle data corresponds to an image which is suitable for learning to detect lesions and is not included in obstacle data.

An obstacle image may be confirmed based on the labeling, and the numbers of the bubbled image (Bubble), the image with the food residues (Residues), the bright image (Bright), and the image with obstacle (Bad Communication) are confirmed as 505 sheets, 14183 sheets, 1034 sheets, and 26 sheets, respectively.

If obstacle data is removed from the medical image data according to the exemplary embodiment of the present disclosure, an obstacle data of 6.224% may be removed according to the following Equation (2).

$$\text{Removal rate of obstacle data} = \frac{(\text{Bubble}) + (\text{Residue}) + (\text{Bright}) + (\text{Bad Communication})}{\text{Total}} \times 100 = \frac{505 + 14183 + 1034 + 26}{253,003} \times 100 = 6.224\%$$

[Equation 2]

FIG. 6 is a flowchart of a method for filtering obstacle data in machine learning of medical images according to an exemplary embodiment of the present disclosure.

A method for filtering obstacle data in machine learning of medical images according to an exemplary embodiment of the present disclosure may include performing labeling classifying obstacle data types for medical image data (S600), receiving definitions of absolute obstacle data and relative obstacle data according to a learning purpose (S602), generating an obstacle data filter using at least any one filter of an image processing-based filter and a learning-based filter (S604), and removing obstacle data for image data (S606).

The description of the obstacle data filtering system described above is equally applied to the obstacle dada filtering method.

The above description just illustrates the technical spirit of the present disclosure and various changes and modifications can be made by those skilled in the art to which the present disclosure pertains without departing from an essential characteristic of the present disclosure. Therefore, the exemplary embodiments of the present disclosure are provided for illustrative purposes only but not intended to limit the technical concept of the present disclosure. The scope of the technical concept of the present disclosure is not limited thereto. The protective scope of the present disclosure should be construed based on the appended claims, and all the technical spirits in the equivalent scope thereof should be construed as falling within the scope of the present disclosure.

What is claimed is:

1. A method for filtering obstacle data in machine learning of medical images using a system including an obstacle data definition unit, a filter generation unit, and a filtering unit, the method comprising:
    receiving, by the obstacle data definition unit, definitions of obstacle data according to a machine learning purpose;
    generating, by the filter generation unit, a filter for filtering the obstacle data; and
    removing, by the filtering unit, the obstacle data using the generated filter,
    wherein the obstacle data are classified into absolute obstacle data and relative obstacle data,
    wherein the absolute obstacle data is data being an obstacle to learning regardless of the machine learning purpose, and the relative obstacle data is data being an obstacle to learning according to a type of the machine learning purpose,
    wherein a type of an image classified as the obstacle data varies according to the machine learning purpose, and
    wherein the image classified as the obstacle data is filtered or is not filtered by using the filter according to the machine learning purpose.

2. The method of claim 1, wherein in the generating of the filter, the filter generation unit generates an obstacle data filter using at least one of an image processing-based filter and a learning-based filter.

3. The method of claim 1, further comprising:
    performing, by a labeling unit, labeling based on the machine learning for the medical image data for the machine learning,
    wherein the labeling is to classify types of the obstacle data.

4. The method of claim 1, further comprising:
    classifying the image into a non-obstacle and an obstacle image, excluding an absolute obstacle image corresponding to the absolute obstacle data from the obstacle image, and filtering the obstacle image from which the absolute obstacle image has been excluded according to the machine learning purpose.

5. The method of claim 4, wherein the image is a capsule endoscopic image, and wherein the machine learning purpose is a purpose of learning to detect a lesion or a purpose of learning to determine a position of a capsule endoscope.

6. A system for filtering obstacle data in machine learning of medical images, the system comprising:

a processor; and a memory storing instructions executable by the processor, wherein the processor is configured to:

receive definitions of obstacle data according to a machine learning purpose;

generate a filter for filtering the obstacle data; and remove the obstacle data using the generated filter, wherein the obstacle data are classified into absolute obstacle data and relative obstacle data, wherein the absolute obstacle data is data being an obstacle to learning regardless of the machine learning purpose and the relative obstacle data is data being an obstacle to learning according to a type of the machine learning purpose, wherein a type of an image classified as the obstacle data varies according to the machine learning purpose, and wherein the image classified as the obstacle data is filtered or is not filtered by using the filter according to the machine learning purpose.

7. The system of claim 6, wherein the processor is further configured to generate an obstacle data filter using at least any one of an image processing-based filter and a learning-based filter.

8. The system of claim 6, wherein the processor is further configured to perform labeling based on the machine learning for the medical image data for the machine learning, wherein the labeling is to classify types of the obstacle data.

9. The system of claim 6, wherein the processor is further configured to:

classify the image into a non-obstacle and an obstacle image, exclude an absolute obstacle image corresponding to the absolute obstacle data from the obstacle image, and filter the obstacle image from which the absolute obstacle image has been excluded according to the machine learning purpose.

10. The system of claim 9, wherein the image is a capsule endoscopic image, and wherein the machine learning purpose is a purpose of learning to detect a lesion or a purpose of learning to determine a position of a capsule endoscope.

\* \* \* \* \*